June 24, 1969  R. I. AXELSSON  3,451,198
MEANS FOR SEPARATING A LIQUID, SUCH AS OIL, FROM A COMPRESSED GAS
Filed Sept. 29, 1967
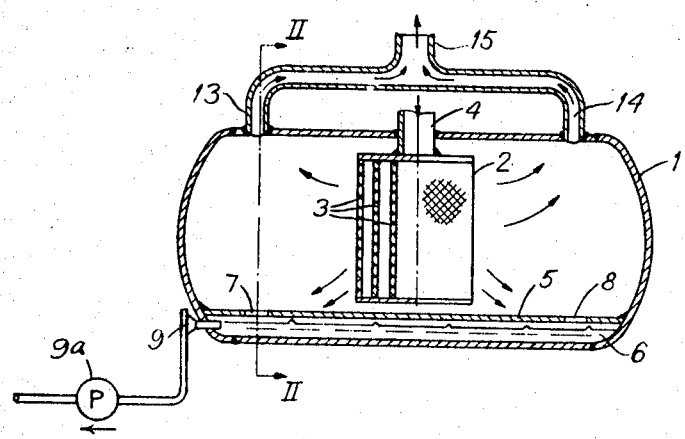
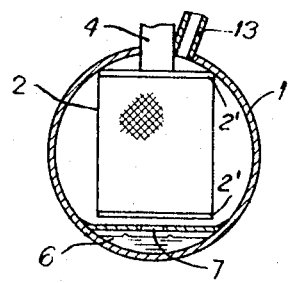
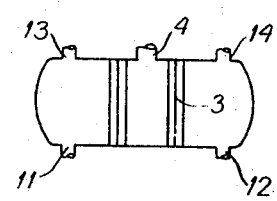
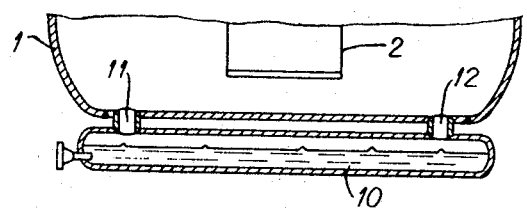
Rolf Ingemar Axelsson United States Patent Office 3,451,198
Patented June 24, 1969

3,451,198
MEANS FOR SEPARATING A LIQUID, SUCH AS OIL, FROM A COMPRESSED GAS
Rolf Ingemar Axelsson, Norrkoping, Sweden, assignor to Stal Refrigeration Aktiebolag, Norrkoping, Sweden, a corporation of Sweden
Filed Sept. 29, 1967, Ser. No. 671,758
Claims priority, application Sweden, Oct. 11, 1966, 13,707/66
Int. Cl. B01d *19/00, 21/02*
U.S. Cl. 55—430    1 Claim

ABSTRACT OF THE DISCLOSURE

Means for separating a liquid, such as oil, from compressed gas, consisting of an elongated, horizontal tank or container having a central inlet for the gas and oil and having a separator within it; the separator being centrally arranged in the container and consisting of one or more layers of mesh or foraminous material for separating the oil from the gas as the gas flows through it and is deflected toward the opposite ends of the container. The oil flows down to the bottom of the container into a chamber thereat and located either within the container or externally thereof and from which the collected oil can be suctionally removed. The gas flowing upwardly in the container emerges therefrom through outlets provided in the top of the container adjacent to the opposite ends of the container.

---

The present invention relates to a liquid separator for separating a fluid, such as an oil, from compressed gas, and such means includes an elongated, substantially horizontally arranged tank or container having an inlet in the central portion of the jacket of the container for the gas entering the same. A separator is positioned centrally in the interior of the container and such separator consists in one or more layers of a fine mesh metal cloth or fabric or other foraminous material for separating the liquid from the gas as the gas flows through the separator and is deflected toward the opposite ends of the container and from which ends purified air flows out through outlets disposed at the ends of the container. The invention is particularly useful in connection with oil injection compressors where large quantities of oil are entrained with the gas, and which must be separated from the gas before the gas is forced out into an apparatus system.

In the accompanying drawing, wherein an illustrative embodiment of the same is disclosed, FIG. 1 shows a separator in axial section;

FIG. 2 shows the separator in cross section along the line II—II in FIG. 1; FIGS. 3 and 4 show a modified construction.

In the drawing 1 indicates a tank or container arranged substantially horizontally, and the same contains a separator 2 centrally arranged within it. Such separator may consist of one or more concentrically arranged fine mesh layers 3 of metal wire cloth, or of fabric or other foraminous material extending between spaced plates $2^1$. The gas and entrained liquid or oil enters the central portion of the separator 2 through an inlet tube 4. The heavier liquid or oil is forced downwardly by the pressure drop which occurs on the passage of the liquid-gas mixture through the separator 2, while the lighter gas flows upwardly as indicated by the arrows in FIG. 1.

The liquid or oil falls slowly down toward a lower wall 5 in the container and which wall partitions the interior of the chamber in a manner to provide a lower chamber 6. Near the opposite ends of the wall 5 are provided openings 7 and 8 through which the liquid runs down into the chamber 6, from whence it is removed by suction through a suction line 9 connected to a suction pump 9a. As is seen in FIG. 3 instead of a partitioned chamber 6, a separator container 10 of relatively small cross-sectional area can be connected to the container or tank 1 by tubes 11 and 12. This liquid chamber 6 offers the advantage that the level of the liquid therein is guaranteed even though the liquid separator is subjected to movement such as when installed in ships, for example.

The gas, with its small amount of liquid, flows at a low speed from the separator, in two opposite directions. Owing to the low rate at which the gas flows, the remaining droplets of liquid in the gas fall toward the bottom of the container, and continue into the chamber situated below the container bottom. The gas, freed from the liquid, flows out through outlets 13 and 14 and which outlets are located adjacent to the opposite ends of the container and are connected to an outlet pipe 15.

Since the separator is positioned centrally in the container 1 and since the outlets are situated at the ends of the container, a two branch flow is obtained. This means that the most favorable use can be made of the dimensions of the vessel in obtaining the requisite minimum speed of the liquid and gas mixture. The separator may not necessarily be cylindrical or annular in shape but may comprise flat layers 3 as shown in FIG. 4 disposed transversely across the container.

What I claim is:

1. An apparatus for separation of oil from compressed gas comprising an elongated horizontal tank closed at the ends, said tank having a pair of gas outlets at the top of the tank, one adjacent each end of the tank and a corresponding pair of liquid outlet openings in the bottom of said tank, a vertical separator positioned centrally in the tank, said separator comprising horizontally extending spaced plates, and spaced co-axial fine mesh cylinders extending between the plates, an inlet tube extending through the center of the top of the tank and through the upper of said plates at the central portion of said upper plate and communicating with the inner of said fine mesh cylinders, whereby oil is separated from gas in passing radially through said cylinders, a horizontal elongated housing disposed below the tank provided with closed ends, said housing having a pair of openings in its top adjacent the ends of the housing and tubes extending from the liquid outlet openings of said tank to said openings in said housing whereby oil flows from the tank into the housing, and means connected to said housing at one end thereof for suctionally withdrawing liquid therefrom.

References Cited

UNITED STATES PATENTS

| 371,794   | 10/1887 | Shelton        | 55—462 |
| 447,327   | 3/1891  | Hussey et al.  | 55—418 |
| 1,223,101 | 4/1917  | Pacziga        | 55—186 |
| 1,405,259 | 1/1922  | Beach          | 55—314 |
| 1,727,733 | 9/1929  | Stovall        | 55—185 |
| 3,212,232 | 10/1965 | McMinn         | 55—186 |
| 3,228,174 | 1/1966  | Perry          | 55—174 |
| 3,352,778 | 11/1967 | Brink et al.   | 55—185 |
| 3,369,347 | 2/1968  | Murdock        | 55—186 |

FOREIGN PATENTS

| 324,987 | 2/1930 | Great Britain. |

HARRY B. THORNTON, *Primary Examiner.*

B. NOZICK, *Assistant Examiner.*

U.S. Cl. X.R.

55—485